United States Patent
Wentink

(10) Patent No.: US 9,088,946 B2
(45) Date of Patent: Jul. 21, 2015

(54) METHODS AND APPARATUS FOR POWER SAVING FOR MESH NODES

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 12/429,114

(22) Filed: Apr. 23, 2009

(65) Prior Publication Data

US 2009/0274082 A1    Nov. 5, 2009

Related U.S. Application Data

(60) Provisional application No. 61/049,164, filed on Apr. 30, 2008.

(51) Int. Cl.
| | |
|---|---|
| *G08C 17/00* | (2006.01) |
| *H04B 7/185* | (2006.01) |
| *H04W 52/02* | (2009.01) |
| *H04W 84/18* | (2009.01) |
| *H04W 74/04* | (2009.01) |

(52) U.S. Cl.
CPC .......... *H04W 52/0216* (2013.01); *H04W 84/18* (2013.01); *H04W 74/04* (2013.01); *Y02B 60/50* (2013.01)

(58) Field of Classification Search
CPC .................................................. H04W 52/0212
USPC ......................................................... 370/311
See application file for complete search history.

(56) References Cited

U.S. PATENT DOCUMENTS

| | | | |
|---|---|---|---|
| 8,018,882 | B1 | 9/2011 | Chhabra |
| 2002/0123345 | A1* | 9/2002 | Mahany et al. ............... 455/432 |
| 2004/0114521 | A1 | 6/2004 | Sugaya |
| 2004/0230638 | A1* | 11/2004 | Balachandran et al. ...... 709/200 |
| 2004/0253996 | A1 | 12/2004 | Chen et al. |
| 2005/0129009 | A1 | 6/2005 | Kitchin |
| 2005/0177639 | A1 | 8/2005 | Reunamaki et al. |
| 2006/0028984 | A1* | 2/2006 | Wu et al. ....................... 370/230 |
| 2006/0280140 | A9* | 12/2006 | Mahany et al. ............... 370/329 |
| 2007/0086399 | A1* | 4/2007 | Akiyama ...................... 370/338 |
| 2007/0206517 | A1 | 9/2007 | Kakani |
| 2007/0226351 | A1* | 9/2007 | Fischer et al. ................ 709/227 |

(Continued)

FOREIGN PATENT DOCUMENTS

| | | |
|---|---|---|
| CN | 1574829 A | 2/2005 |
| CN | 1806264 A | 7/2006 |

(Continued)

OTHER PUBLICATIONS

International Search Report and Written Opinion—PCT/US2009/042397, International Search Authority—European Patent Office—Aug. 12, 2009.

(Continued)

*Primary Examiner* — Gerald Smarth

(74) *Attorney, Agent, or Firm* — Darren M. Simon

(57) ABSTRACT

Methods and apparatus for implementing power saving in mesh nodes include transmitting a receive window start frame prior to each awake period. The receive window start frame is a short frame, and nodes in the mesh network passively monitor for this frame. Upon detection, a mesh node can transmit data to its destination during its awake period.

24 Claims, 8 Drawing Sheets

(56) References Cited

U.S. PATENT DOCUMENTS

| | | | |
|---|---|---|---|
| 2007/0242634 A1* | 10/2007 | Calcev et al. | 370/318 |
| 2007/0242695 A1* | 10/2007 | Xu | 370/468 |
| 2007/0286136 A1 | 12/2007 | Rittle et al. | |
| 2007/0287456 A1 | 12/2007 | Shimizu | |
| 2007/0297375 A1* | 12/2007 | Bonta et al. | 370/338 |
| 2008/0070523 A1 | 3/2008 | Masri et al. | |
| 2008/0080475 A1* | 4/2008 | Orth et al. | 370/350 |
| 2008/0095091 A1 | 4/2008 | Surineni et al. | |
| 2008/0095126 A1* | 4/2008 | Mahany et al. | 370/338 |
| 2008/0112347 A1* | 5/2008 | Gossain et al. | 370/311 |
| 2008/0151814 A1* | 6/2008 | Jokela | 370/328 |
| 2008/0170552 A1 | 7/2008 | Zaks | |
| 2008/0267105 A1* | 10/2008 | Wang et al. | 370/311 |
| 2009/0026852 A1 | 1/2009 | Mall et al. | |
| 2009/0201860 A1 | 8/2009 | Sherman et al. | |
| 2009/0232042 A1* | 9/2009 | Kneckt et al. | 370/312 |
| 2009/0268652 A1* | 10/2009 | Kneckt et al. | 370/311 |
| 2009/0274083 A1 | 11/2009 | Wentink | |
| 2009/0279487 A1 | 11/2009 | Reumerman et al. | |

FOREIGN PATENT DOCUMENTS

| | | |
|---|---|---|
| CN | 1898900 A | 1/2007 |
| CN | 101087172 A | 12/2007 |
| CN | 101164255 A | 4/2008 |
| CN | 101193066 A | 6/2008 |
| JP | 2006093787 A | 4/2006 |
| JP | 2006314121 A | 11/2006 |
| JP | 2006325175 A | 11/2006 |
| WO | 2006134472 A2 | 12/2006 |
| WO | 2007044597 | 4/2007 |
| WO | 2008019140 A2 | 2/2008 |

OTHER PUBLICATIONS

Shih-Lin Wu et al: "An energy efficient MAC protocol for IEEE 802.11 WLANs" Communication Networks and Services Research, 2004. Proceedings. Second Annual Conference on Freeericton, NB,Canada May 19-21, 2004, Piscataway, NJ,USA, IEEE , May 19, 2004, pp. 137-145, XP010732725.

IEEE Standard for Information technology—Telecommunications and information exchange between systems—Local and metropolitan area networks—Specific requirements—Part 11: Wireless LAN Medium Access Control (MAC) and Physical Layer (PHY) Specifications; IEEE Std 802.11-2007 ISBN: 978-0-7381-5656-9 (Jun. 12, 2007).

\* cited by examiner

METHODS AND APPARATUS FOR POWER SAVING FOR MESH NODES

CLAIM OF PRIORITY UNDER 35 U.S.C. §119

The present application for patent claims priority to Provisional Application No. 61/049,164 entitled "Methods and Apparatus for Power Saving for Mesh Nodes" filed Apr. 30, 2008, and assigned to the assignee hereof and hereby expressly incorporated by reference herein.

REFERENCE TO CO-PENDING APPLICATIONS FOR PATENT

The present Application for Patent is related to the following U.S. Patent Applications:

U.S. patent application Ser. No. 12/429,118, entitled "METHODS AND APPARATUS FOR SCANNING FOR MESH NODES," filed Apr. 23, 2009, assigned to the assignee hereof, and expressly incorporated by reference herein.

BACKGROUND

1. Field

This application relates generally to mesh networks, and more particularly to saving power while delivering traffic in mesh networks.

2. Background 802.11 is a set of IEEE standards that govern wireless networking transmission methods. Several versions of 802.11 are used to provide wireless connectivity in the home, office and some commercial establishments. IEEE standards include versions 802.11a, 802.11b, 802.11g, etc. IEEE 802.11s is a draft IEEE 802.11 amendment for mesh networking. Mesh networking defines how wireless devices interconnect, creating an extended ad-hoc network in which multiple hops may need to be traversed.

Currently in mesh networking, mesh nodes can be allowed to enter a power saving mode while remaining in contact with their peer mesh nodes. Power saving mesh nodes start an Awake Window after each beacon they transmit. Traffic buffered for a peer mesh node in power save is indicated through a mesh traffic indication message (TIM) field in the beacon. When a power saving mesh node sees its TIM bit set in a received beacon, it starts a service period during the peer station's (STA) Awake Window (if it is asleep also). The buffered traffic is then delivered during this service period.

One problem with the current power saving method is that the power saving mesh node needs to receive beacons from all of its peers, which given the duration of the beacon and the frequency of its transmission can result in quite a lot of wake time, while most of the time the TIM bits will not be set anyway. Accordingly, it would be desirable to have a power saving method which would allow data transmission without requiring nodes to receive and examine beacons from all peer nodes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, a method for receiving data from a peer node comprises informing the peer node of a schedule of awake periods; being awake at least during the scheduled awake periods; and receiving data from the peer node during a scheduled awake period.

According to some aspects, a method of transmitting data to a power save node in a mesh network comprises obtaining a wake-up schedule from the power save node; and transmitting the data to the power save node during a scheduled awake period.

According to some aspects, an apparatus operating as a mesh node comprises a processor and a power saving module, said power saving module comprising a start frame generator for generating and transmitting a frame indicating a mesh node has an upcoming awake period, wherein the mesh node is available to receive data during the awake period.

According to some aspects, an apparatus operating as a mesh node in a mesh network comprises means for sending a schedule of awake periods to one or more peer mesh nodes; means for transmitting a receive window start frame prior to each scheduled awake period; and means for receiving data from one or more other nodes in the mesh network during the scheduled awake period.

According to some aspects, an apparatus operating as a mesh node in a mesh network comprises means for detecting a receive window start frame associated with a destination mesh node, the receive window start frame indicating an upcoming awake period; and means for transmitting data to the destination mesh node during the awake period according to a channel access mechanism used to access the communication channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
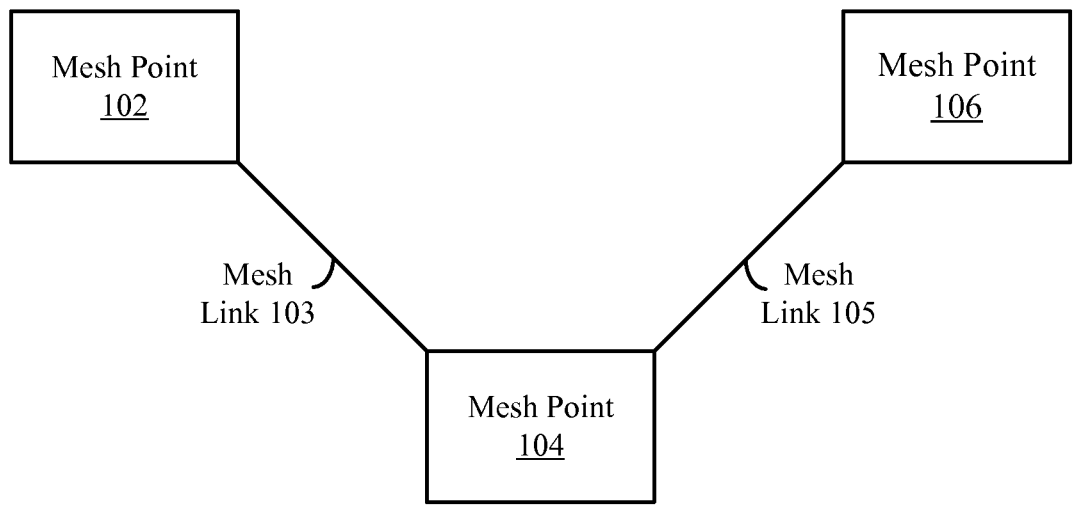
FIG. 1 is an example of a mesh network, in accordance with various disclosed aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers.

In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point (AP), a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for peer-to-peer (e.g., mobile-to-mobile) ad hoc network systems, such as, 802.xx wireless LAN, BLUETOOTH and any other short- or long-range, wireless communication techniques. Further, these techniques and networks may be used in combination with various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

In one aspect, a mesh network may be defined as two or more nodes that are interconnected via IEEE 802.11 links which communicate via mesh services and comprise an IEEE 802.11 based Wireless Distribution System (WDS). Mesh networking is a way to route data, voice and instructions between nodes. It allows for continuous connections and reconfiguration around broken or blocked paths by "hopping" from node to node until the destination is reached. A mesh network whose nodes are all connected to each other is a fully connected network. Mesh networks differ from other networks in that the component parts can all connect to each other via multiple hops. Mesh networks can be seen as one type of ad hoc network.

Mesh networks are self-healing. This means that the network can continue to operate even when a node breaks down or a connection goes bad. As a result, a very reliable network may be formed. This concept is applicable to wireless networks, wired networks, and software interaction.

FIG. 1 depicts an exemplary mesh network 100 in which the mechanisms and techniques described herein can be implemented. Mesh network 100 may include a plurality of mesh points (MP), such as MP 102, MP 104, and MP 106. Each mesh point may be linked or connected (through a wired or wireless link) to another mesh point through a mesh link (ML). For example, MP 102 and MP 104 are linked through mesh link 103. Similarly, MP 104 is linked to MP 106 through mesh link 105. It is noted that a mesh point can be an individual device that uses mesh services to communicate with other devices in the network, an access point (e.g., an 802.11 access point), a gateway to other networks (e.g., non-mesh networks), or any other communications device. Individual devices may include, for example, mobile phones, laptops, personal computers, handheld communication devices, satellite radios, global positioning systems, personal digital assistants (PDAs), and/or any other suitable device.

Figure 2:
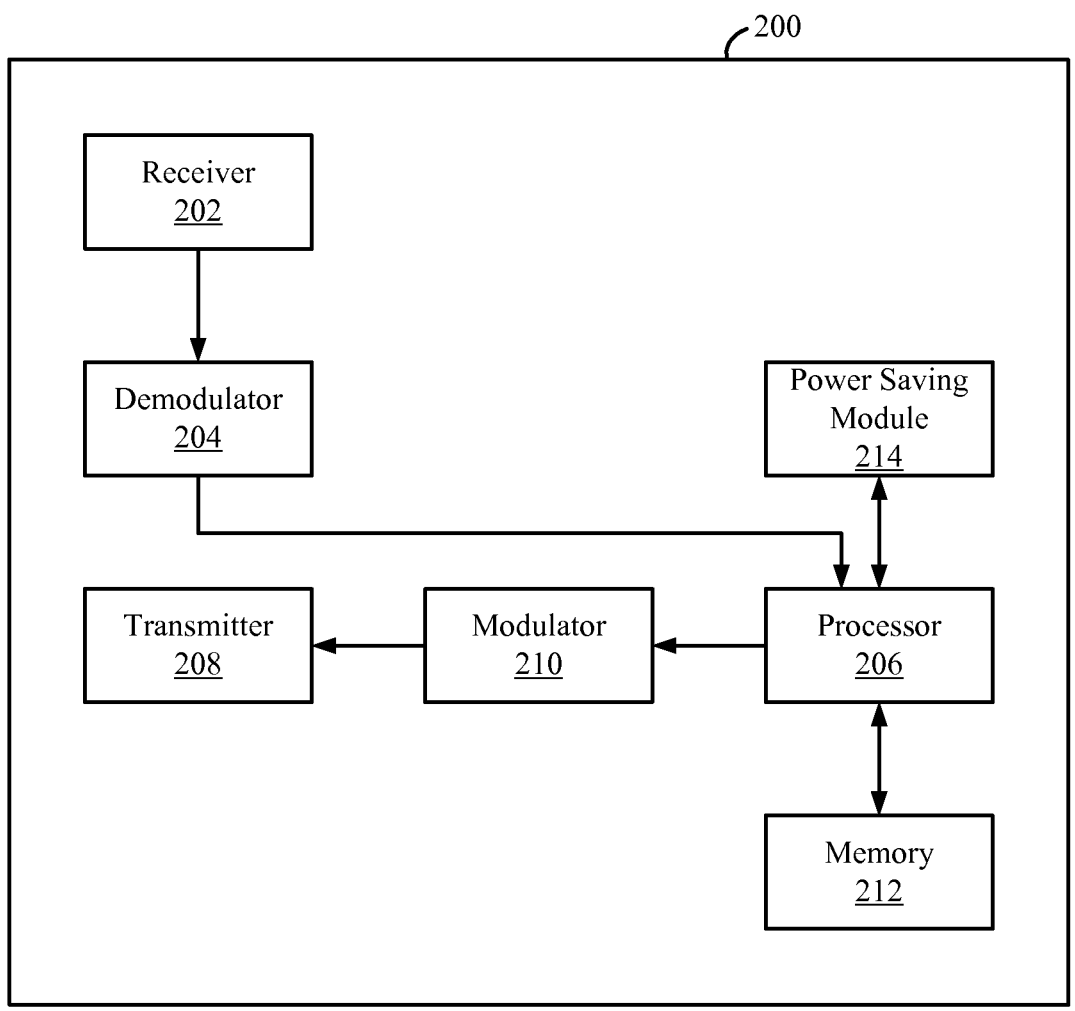
FIG. 2 is depicts an exemplary mesh node, in accordance with various disclosed aspects.

FIG. 2 depicts an exemplary device 200 operating as a mesh point in a mesh network. Device 200 may comprise a receiver 202, demodulator 204, processor 206, transmitter 208, modulator 210, and memory 212. Receiver 202 may receive a signal and perform typical actions thereon, such as filtering, amplifying, downconverting, etc. Receiver 202 may provide digitized samples to demodulator 204 which demodulates the received signals and provides them to processor 206 for channel estimation. Processor 206 may be configured to analyze information received by receiver 202 and generate information for transmission by transmitter 208. Processor 206 may be further configured to control one or more components of device 200. Memory 212 may store information used by the other components of device 200.

Figure 3:
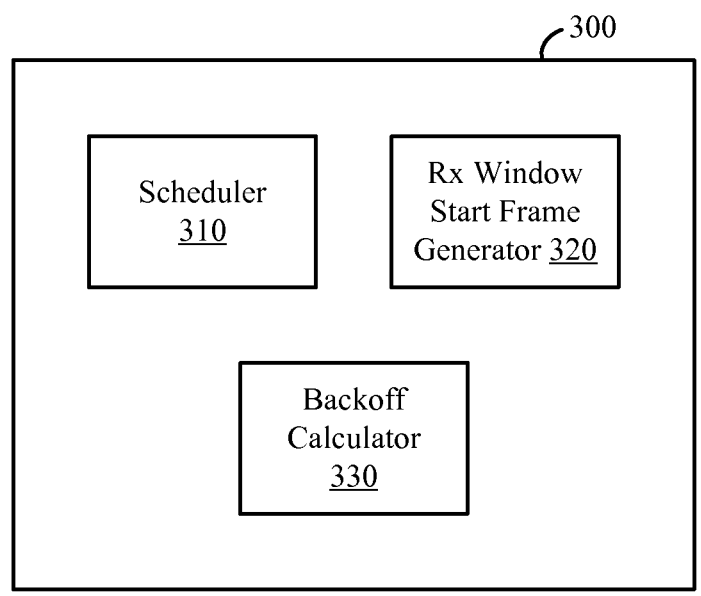
FIG. 3 depicts a power saving module, in accordance with various disclosed aspects.

Device 200 may further comprise a power saving module 214, which allows the mesh point to enter a power saving mode while remaining in contact with peer mesh nodes. In mesh networks, large information frames, known as beacons, are periodically transmitted by each mesh node. Beacons may be used for a variety of purposes. For example, beacons allow a prospective mesh node to learn of other devices to which it may connect. As another example, beacons may also include an indicator that a mesh node has data to be transmitted to another node, which may be a power saving node. Monitoring beacons from a plurality of peer nodes is time consuming for a node in power save mode. According to exemplary aspects, a power saving module is operable to allow the mesh point to remain in contact with peer mesh nodes while in a power saving mode without the cumbersome task of periodically sending and receiving beacons. FIG. 3 depicts a power saving module 300, in accordance with various aspects.

Power saving module 300 may comprise a scheduler 310, a receive window start frame generator 320, and a back-off calculator 330. Scheduler 310 may be configured to exchange awake time schedules with other mesh network members. In some aspects, the schedule information is provided upon joining a mesh network. As such, every node is aware of the wakeup schedule of connected power save nodes. It is during the awake window (also referred to herein as a receive window or awake period) that a power save node is available to accept data.

Receive window start frame generator 320 may generate and transmit a receive window start (RxWinStart) frame prior to each awake window. The RxWinStart frame may be substantially smaller in size than a beacon, thereby saving additional power for the transmit mesh node and the receive mesh node. According to some aspects, the RxWinStart frame may include, among other things, a length indicator indicating the length of the upcoming awake window. The length may be expressed in a variety of units such as, for example, a time period, a number of slots, and/or some other unit.

According to some aspects, a beacon may be transmitted in addition to the RxWinStart frame. The beacon may be used, for example, by new nodes wishing to join the mesh to locate other mesh nodes. The RxWinStart frame may be transmitted at any time prior to the scheduled beginning of an awake window. According to some exemplary aspects, the RxWinStart frame may be transmitted such that the awake window corresponds to the time in which the node's beacon is transmitted. For example, the RxWinStart frame may be transmitted halfway between the target beacon transmit time (TBTT), or may be scheduled to end at TBTT.

In some aspects, to mitigate the effect of other traffic on the communication channel, the awake window may be defined as a fixed backoff. That is, each node may define its awake window as a fixed number of time slots rather than a fixed interval of time.

To minimize and/or avoid collisions, backoff slot calculator 330 may be configured to determine a backoff to be used by a node prior to transmitting data. According to some aspects, a node may generate a random number, and wait the random number of slots prior to transmitting. The random number should be less than or equal to the backoff slot length of the destination node. The backoff slot length for each node may be shared with each other node upon joining a mesh network.

As described above, beacons may be transmitted in addition to the RxWinStart frame. According to some aspects, the RxWinStart frame may include a counter field which keeps track of changes to the beacon. Thus, a node receiving the RxWinStart frame would only review the beacon or receive a probe response if the counter field in the start frame window indicates a change has been made to the beacon.

Figure 4:
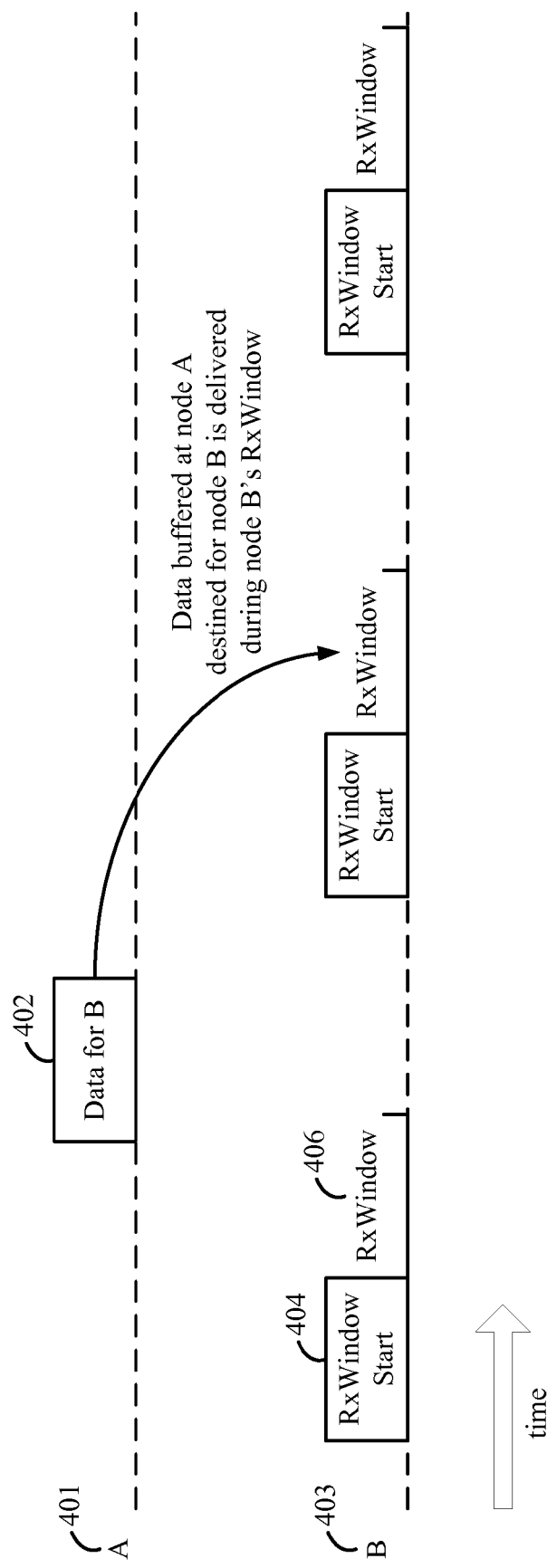
FIG. 4 is a timing diagram depicting various disclosed aspects.

FIG. 4 is a timing diagram depicting an example of data transmission using a receive window start frame. Nodes A 401 and B 403 may be members of a mesh network. As depicted at 402, Node A 401 has data for Node B 403. Node A 401 may be aware of Node B's 403 wakeup schedule based on information exchanged during initialization of the mesh network (e.g., during the process of setting up and/or joining the mesh network) or some time thereafter.

Node B 403 may transmit periodic RxWinStart frames 404. These frames indicate that an awake period or receive window (Rx Window) 406 is forthcoming. In some aspects, the start frame immediately precedes an awake period. In other aspects, the start frame may inform other nodes that an awake period will follow at a specified time. In yet other aspects, the awake period is not preceded by an RxWindowStart frame. As depicted in FIG. 4, Node A 401 delivers its buffered data to Node B 403 during the next available awake period.

Figure 5:
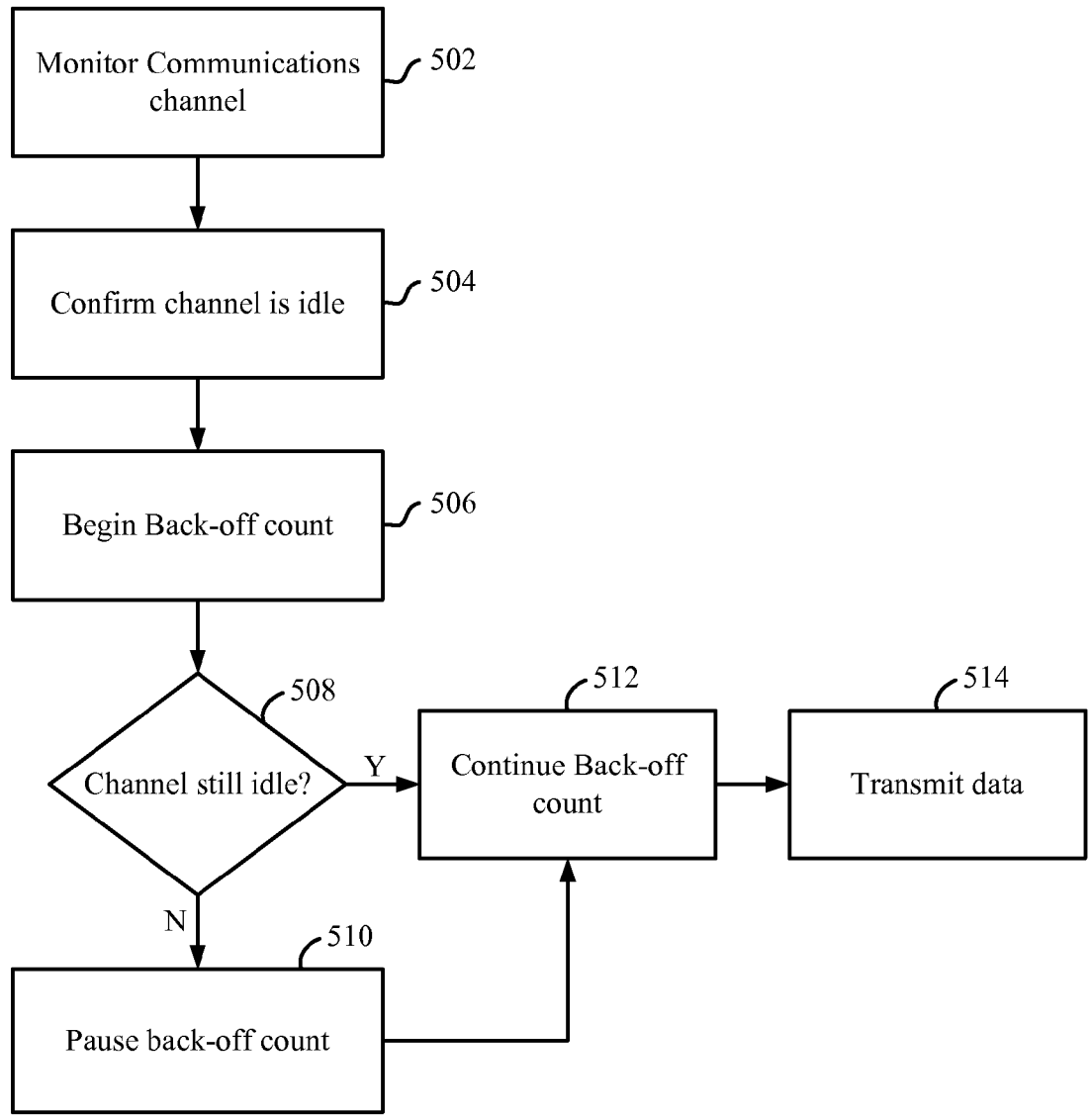
FIG. 5 is a flowchart depicting data transfer, in accordance with various disclosed aspects.

FIG. 5 is a flowchart depicting an exemplary method of exchanging data during a mesh node's awake period. This process may take place when a first node has data to be transmitted to a second node. As depicted at 502, a node having buffered data for transmission to a second node monitors the communication channel for a receive window start frame from the second node. This frame indicates that the receiving node will be awake and available to receive transmissions. When no awake window start frames are transmitted by the receiving node, the transmitting node simply assumes that the receiving node is awake at the beginning of its awake windows.

Upon detection of a receive window start frame, the transmitting node may listen to the channel for a predetermined period of time prior to initiating its transmission, as depicted at 504. That is, the transmitting node senses whether the communication channel is idle for a predetermined time, such as the arbitration interframe space AIFS or a backoff, prior to initiating a transmission. When no awake window start frames are transmitted by the receiving node, the transmitting node delays its transmission at least until the start of the awake window. A backoff preceding the transmission may be started prior to the scheduled beginning of the awake window. However, the transmission itself may start after the beginning of the awake window to guarantee that the receiving node is awake at that time. In general, the transmitting node follows the channel access rules that govern access to the channel, such as Enhanced Distributed Channel Access (EDCA).

Once the channel has been idle for the predetermined time, the transmitting node may begin a backoff count to determine when to initiate a transmission, as depicted at 506. The backoff count may be a random number of time slots between zero and the destination node's fixed backoff period. Thus, the transmitting node waits for the designated number of time slots to pass prior to placing its data on the transmission channel. Waiting a backoff period prior to transmission minimizes transmission errors and collisions as each node wishing to transmit may select a random number representing the time slot in which transmission should begin.

While the transmitting node is performing its backoff count, it is possible that another device may begin a transmission. For example, a device selecting a smaller random number may begin transmitting before the transmitting node completes its backoff count. As depicted at 508, the transmitting node continues to monitor the channel and determines whether another device has begun transmitting during the transmitting nodes' backoff count. If another device has begun transmitting, as depicted at 510, the transmitting node pauses its count until the transmission is complete.

As depicted at 512, if no other device has begun transmission during the transmitting nodes' backoff count, or upon completion of another device's transmission, the transmitting node may continue its backoff count. Upon completion, the transmitting device places its data on the communication channel destined for the receiving node, as depicted at 514.

Figure 6:
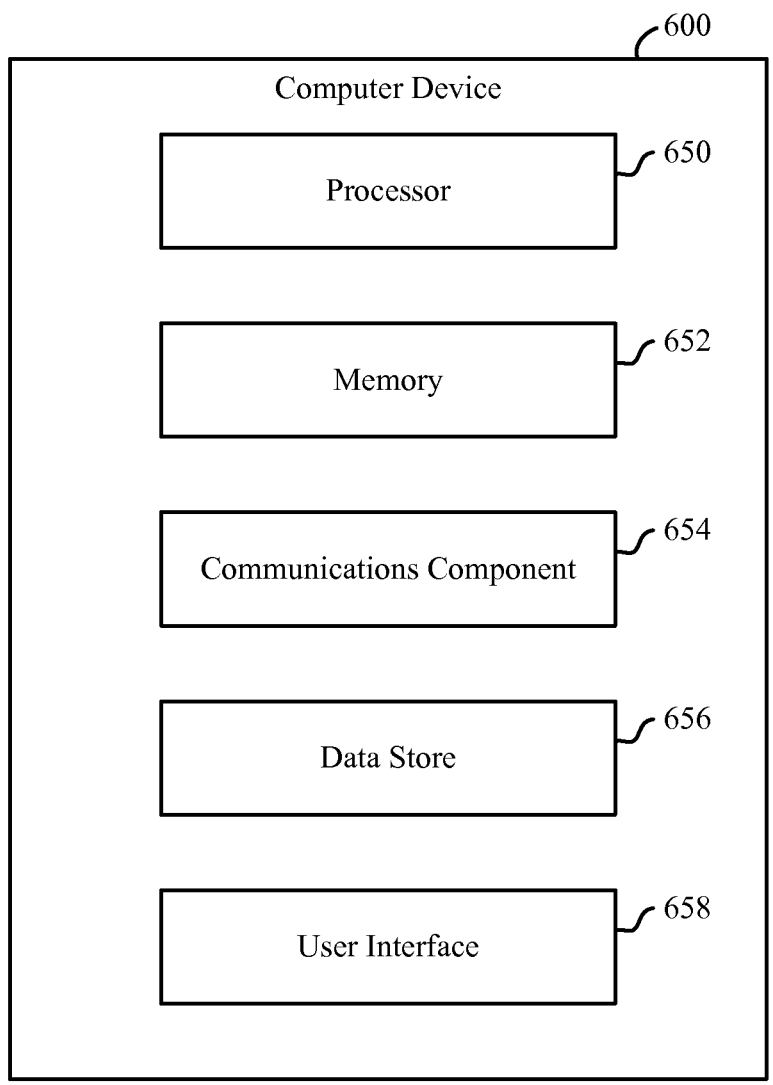
FIG. 6 depicts a wireless communication device wherein various disclosed aspects may be implemented.

FIG. 6 depicts a wireless communications device 600 which may be used as a mesh node for example, to implement mesh points 200 (FIG. 2) and/or 300 (FIG. 3). Wireless communications device 600 includes processor component 650 for carrying out processing functions associated with one or more of components and functions described herein. Processor component 650 can include a single or multiple set of processors or multi-core processors. Moreover, processing component 650 can be implemented as an integrated processing system and/or a distributed processing system.

Wireless communications device 600 further includes a memory 652, such as for storing local versions of applications being executed by processor component 650. Memory 652 can include random access memory (RAM), read only memory (ROM), and a combination thereof.

Further, wireless communications device 600 includes a communications component 654 that provides for establishing and maintaining communications with one or more parties utilizing hardware, software, and services as described herein. Communications component 654 may carry communications between components on wireless communications device 600, as well as between wireless communications device 600 and external devices, such as devices located across a communications network and/or devices serially or locally connected to wireless communications device 600.

Additionally, wireless communications device 600 may further include a data store 656, which can be any suitable combination of hardware and/or software, that provides for mass storage of information, databases, and programs employed in connection with aspects described herein. For example, data store 656 may be a data repository for applications not currently executing.

Wireless communications device 600 may additionally include a user interface component 658 operable to receive inputs from a user of wireless communications device 600, and to generate outputs for presentation to the user. User interface component 658 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 658 may include one or more output devices, including but not limited to a display, a speaker, a haptic feedback mechanism, a printer, any other mechanism capable of presenting an output to a user, or any combination thereof.

Figure 7:
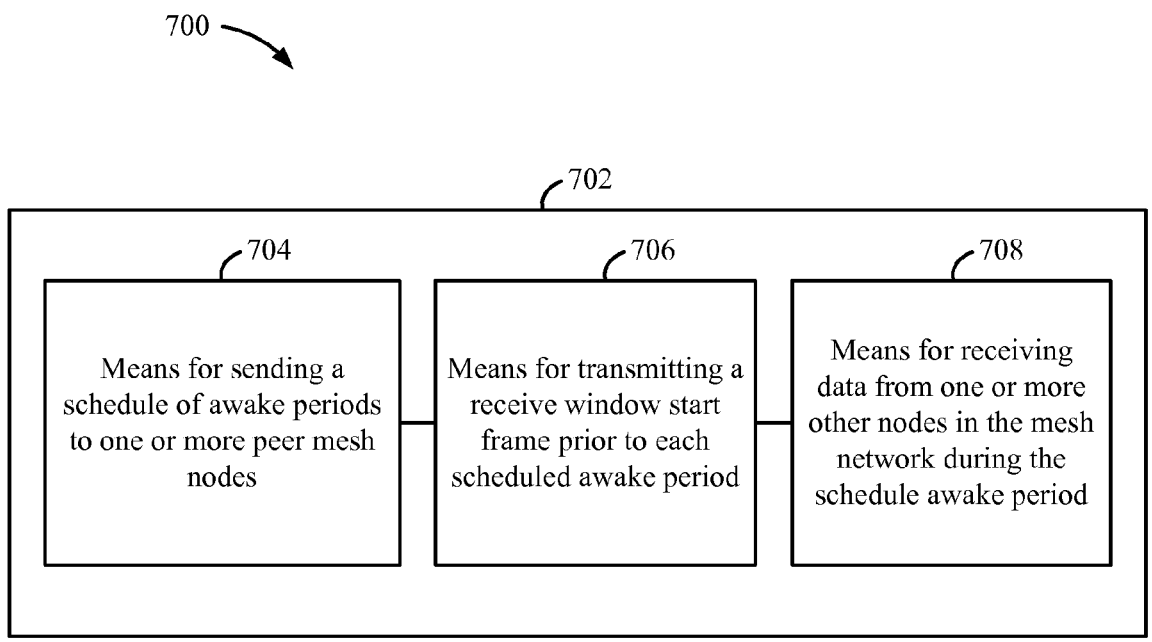
FIG. 7 depicts a system for receiving and processing messages, in accordance with various aspects.

With reference to FIG. 7, illustrated is a system 700 that receives and processes messages received over a wireless mesh network. For example, system 700 can reside at least partially within a receiver, transmitter, mobile device, etc. It is to be appreciated that system 700 is represented as including functional blocks, which can be functional blocks that represent the functions implemented by a processor, software, or a combination thereof (e.g., firmware). System 700 includes a logical grouping 702 of electrical components that can act in conjunction. For instance, logical grouping 702 can include means for sending a schedule of awake periods to one or more peer mesh nodes 704. Logical grouping 702 can also comprise means for transmitting a receive window start frame prior to each scheduled awake period 706. Logical grouping 702 can further comprise means for receiving data from one or more other nodes in the mesh network during the scheduled awake period 708.

Figure 8:
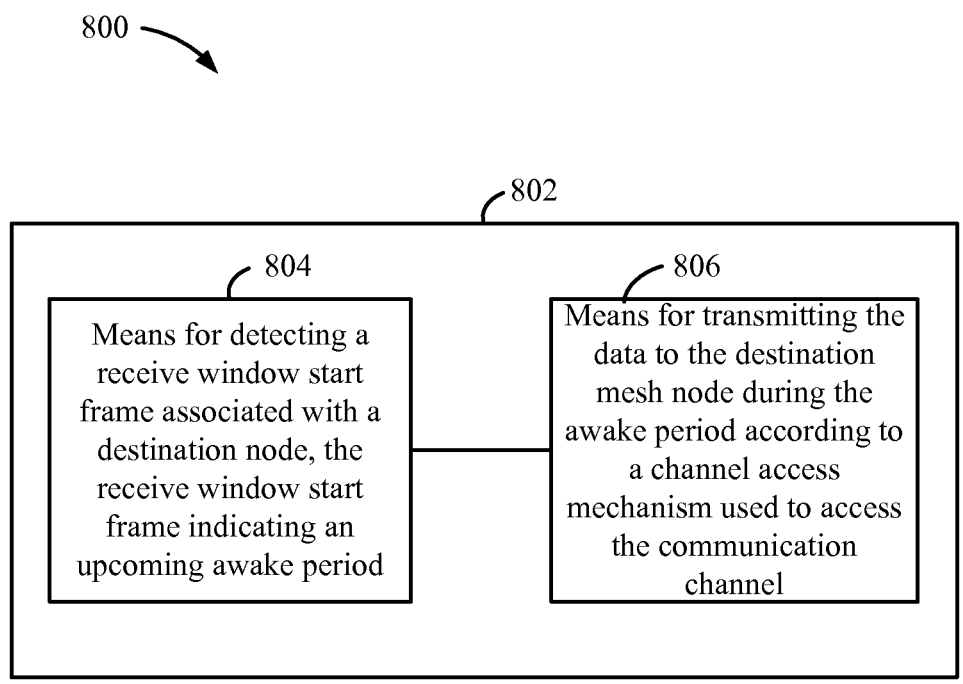
FIG. 8 depicts another system for receiving and processing messages, in accordance with various aspects.

Turning now to FIG. 8, another system 800 is illustrated that receives and processes messages received over a wireless mesh network. For example, system 800 can reside at least partially within a receiver, transmitter, mobile device, etc. It is to be appreciated that system 800 is represented as including functional blocks, which can be functional blocks that represent the functions implemented by a processor, software, or a combination thereof (e.g., firmware). System 800 includes a logical grouping 802 of electrical components that can act in conjunction. For instance, logical grouping 802 can include means for detecting a receive window start frame associated with a destination mesh node, the receive window start frame indicating an upcoming awake period 804. Logical grouping 802 can also comprise means for transmitting the data to the destination mesh node during the awake period according to a channel access mechanism used to access the communication channel 806.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for receiving data from a peer node comprising:
   transmitting, by a first node to the peer node, a receive window start frame prior to each of one or more scheduled awake periods of the first node and the peer node, wherein the receive window start frame indicates an upcoming awake period and includes a beacon change field indicating whether a change has been made to a beacon;
   periodically transmitting the beacon, said beacon comprising information about the first node; and
   receiving data from the peer node during a scheduled awake period.

2. The method of claim 1, wherein the first node and the peer node are connected by a mesh link.

3. The method of claim 1, wherein each awake period is defined as a fixed number of timeslots.

4. The method of claim 1, wherein each awake period is defined as a fixed period of time.

5. The method of claim 1, wherein the receive window start frame includes a length field identifying the length of the upcoming awake period.

6. The method of claim 5, wherein the length is expressed in units of time.

7. The method of claim 5, wherein the length is expressed as a number of backoff slots.

8. The method of claim 1, wherein said receive window start frame is substantially smaller in size than said beacon.

9. The method of claim 1, wherein the beacon change field comprises a counter value which is updated after each significant beacon change.

10. A method of transmitting data to a power save node in a mesh network, comprising:
    receiving at a first node, from the power save node, a receive window start frame indicating an upcoming awake period of the power save node, the receive window start frame being transmitted by the power save node prior to each of one or more scheduled awake periods of the first node and the power save node, and wherein the receive window start frame includes a beacon change field indicating whether a change has been made to a beacon;
    periodically receiving the beacon, said beacon comprising information about the power save node; and
    transmitting the data to the power save node during a scheduled awake period.

11. The method of claim 10, wherein the awake period is a fixed number of backoff slots.

12. An apparatus operating as a mesh node comprising:
    a processor;
    a power saving module, said power saving module comprising a start frame generator for generating and transmitting a frame indicating to other mesh nodes that the mesh node has an upcoming awake period, wherein the mesh node is available to receive data during the awake period, wherein the frame is transmitted prior to each of one or more scheduled awake periods of the mesh node and the other mesh nodes, and includes a beacon change field indicating whether a change has been made to a beacon; and
    a beacon generator for generating the beacon comprising information about the mesh node.

13. The apparatus of claim 12, wherein the power saving module further comprises:
    a scheduler for exchanging awake period information with the other mesh nodes; and
    a receive window start frame generator for generating the frame indicating the mesh node has an upcoming awake period and is available to receive data.

14. The apparatus of claim 12, wherein the awake period is defined as a fixed number of timeslots.

15. The apparatus of claim 12, wherein the awake period is defined as a fixed period of time.

16. The apparatus of claim 12, wherein the frame indicating the upcoming awake period includes a length field identifying the length of the upcoming awake period.

17. The apparatus of claim 16, wherein the length is expressed as a number of time slots.

18. The apparatus of claim 16, wherein the length is expressed in units of time.

19. The apparatus of claim 12, wherein said frame indicating the mesh node is awake is substantially smaller in size than said beacon.

20. The apparatus of claim 12, wherein the beacon change field comprises a counter value which is updated after each significant beacon change.

21. An apparatus operating as a mesh node, comprising:
    a processor;
    a receiver for detecting a receive window start frame associated with a destination mesh node, the receive window start frame indicating an upcoming awake period of the destination mesh node, the receive window start frame being transmitted by the destination mesh node to the mesh node prior to each of one or more scheduled awake periods of the destination mesh node and the mesh node, and for periodically receiving a beacon, said beacon comprising information about the destination mesh node; and a transmitter for transmitting data to the destination mesh node during a scheduled awake period, wherein said receive window start frame includes a beacon change field indicating whether a change has been made to the beacon.

22. The apparatus of claim 21, wherein the awake period is a fixed number of timeslots.

23. An apparatus operating as a mesh node in a mesh network, comprising:

means for transmitting, from the mesh node to one or more other nodes in the mesh network, a receive window start frame prior to each of one or more scheduled awake periods of the mesh node and one or more other nodes, the receive window start frame indicating an upcoming awake period and includes a beacon change field indicating whether a change has been made to a beacon;

means for periodically transmitting the beacon, said beacon comprising information about the mesh node; and means for receiving data from the one or more other nodes in the mesh network during the scheduled awake period.

24. An apparatus operating as a mesh node in a mesh network, comprising:

means for receiving a receive window start frame indicating an upcoming awake period of a destination mesh node, the receive window start frame being transmitted by the destination mesh node to the mesh node prior to each of one or more scheduled awake periods, wherein the receive window start frame includes a beacon change field indicating whether a change has been made to a beacon;

means for periodically receiving the beacon, said beacon comprising information about the destination mesh node; and means for transmitting data to the destination mesh node during the awake period, wherein said receive window start frame includes a beacon change field indicating whether a change has been made to the beacon.

* * * * *